W. W. NEIGHBOUR.
ANTIFRICTION BEARING.
APPLICATION FILED JUNE 7, 1915.
1,198,370.
Patented Sept. 12, 1916.
3 SHEETS—SHEET 2.
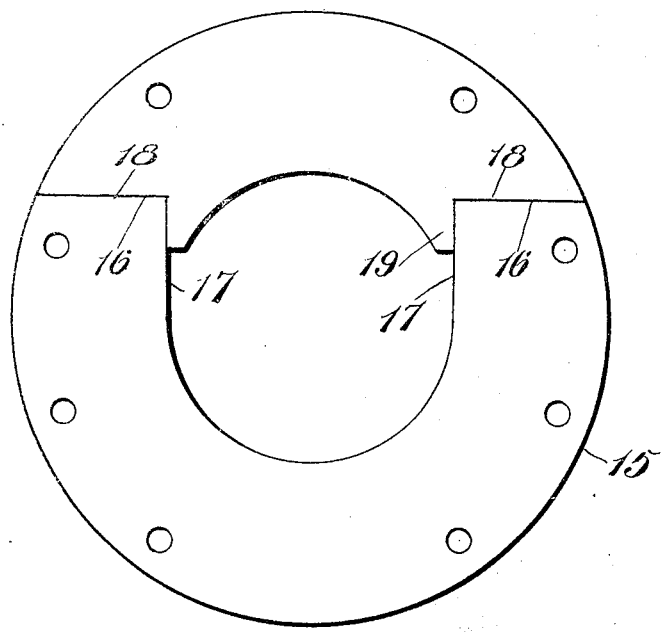
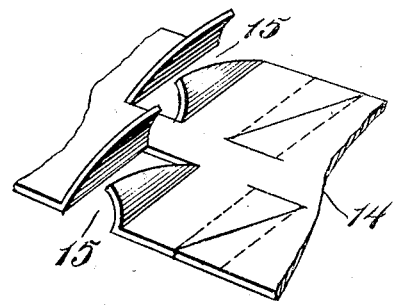
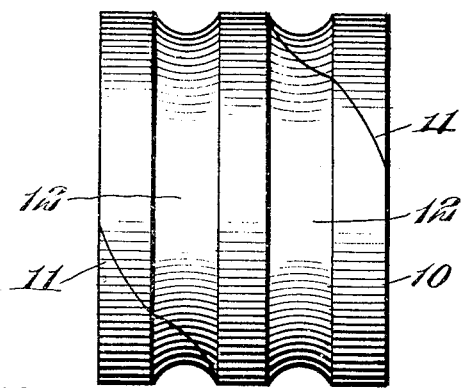
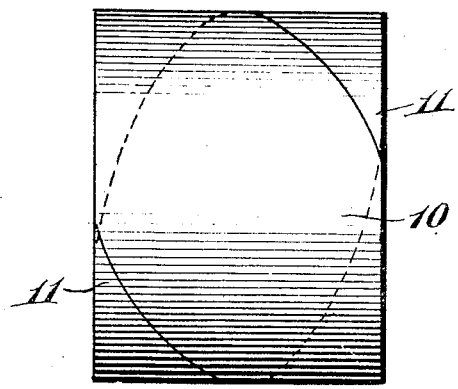
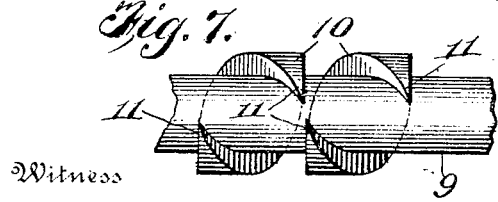
Witness
J. R. Heinrichs
Inventor
W. W. Neighbour
By Victor J. Evans
Attorney W. W. NEIGHBOUR.
ANTIFRICTION BEARING.
APPLICATION FILED JUNE 7, 1915.
1,198,370.
Patented Sept. 12, 1916.
3 SHEETS—SHEET 3.
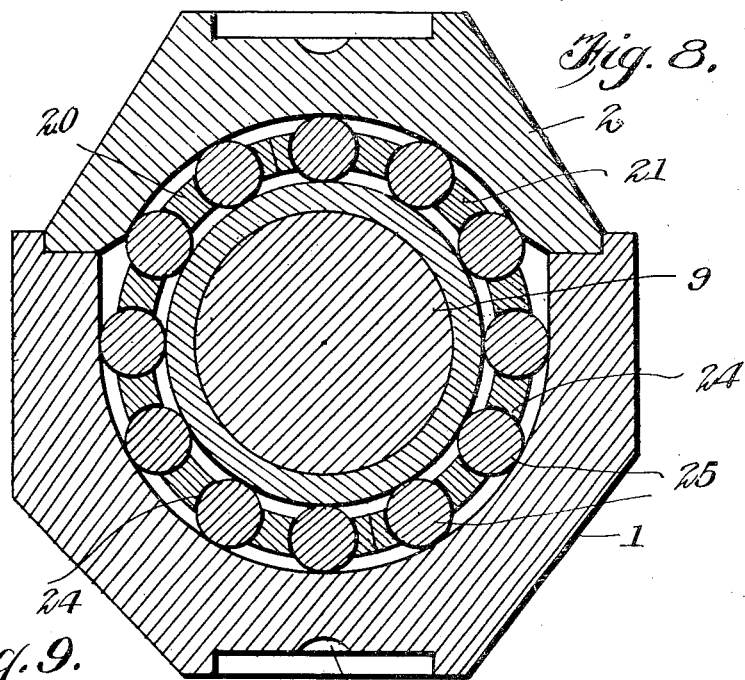
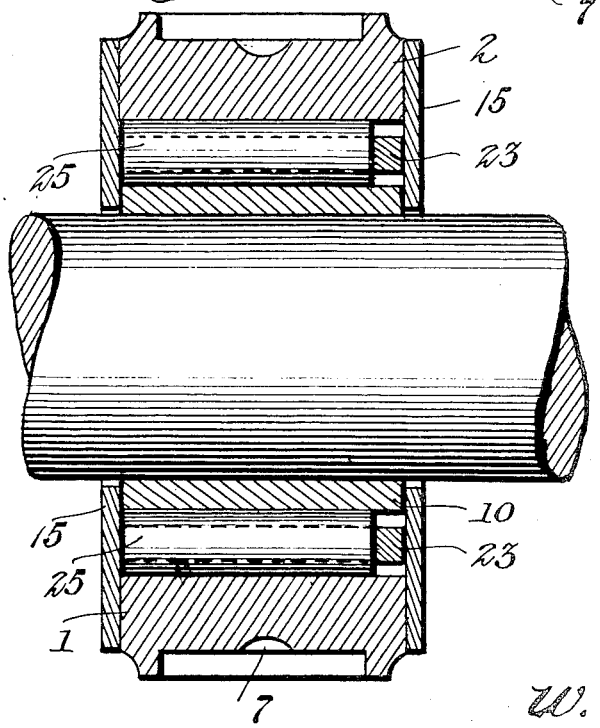
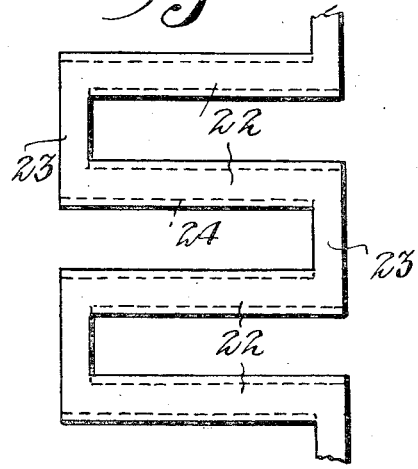

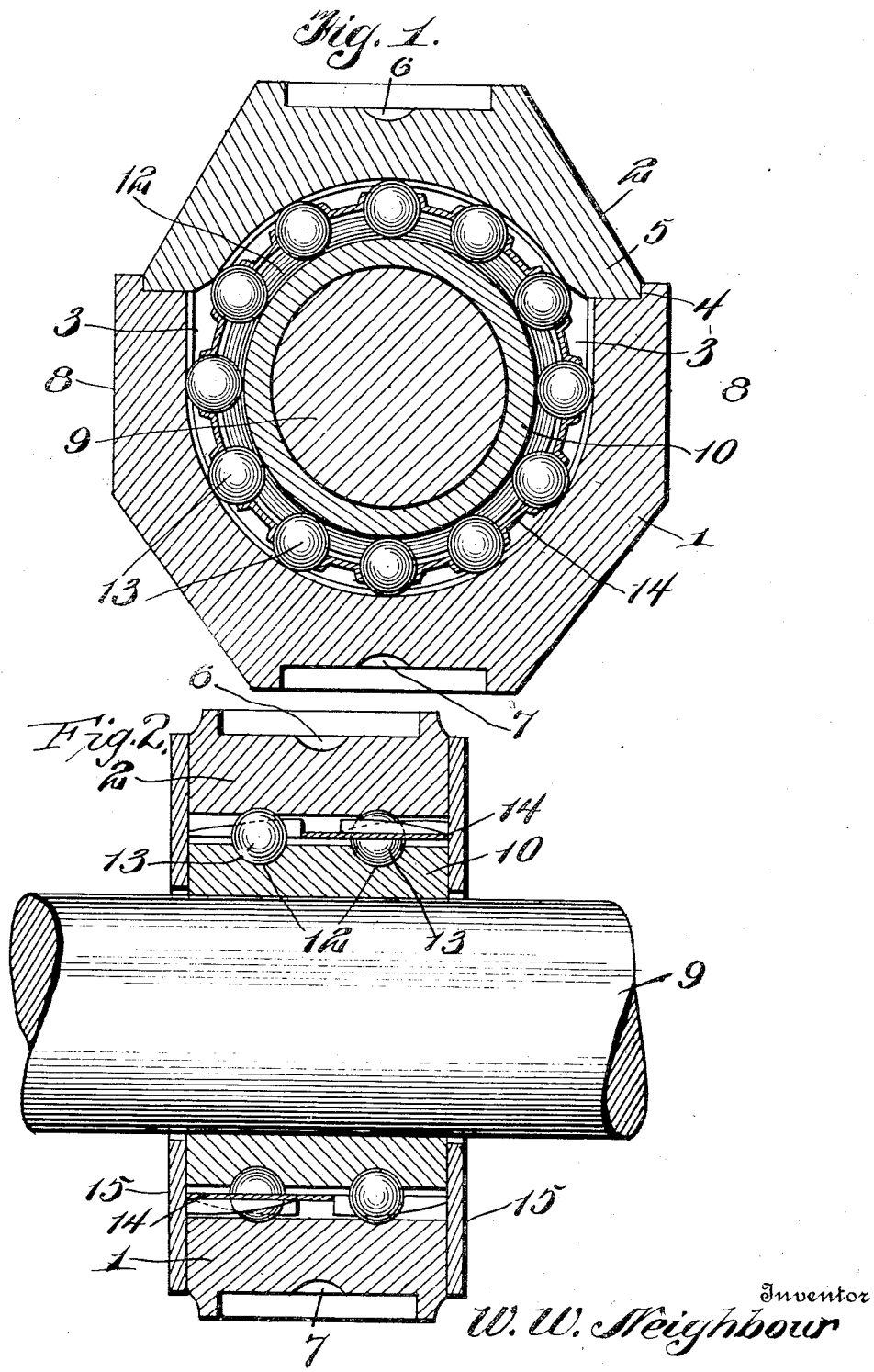

UNITED STATES PATENT OFFICE.

WILLIAM W. NEIGHBOUR, OF SPARTANBURG, SOUTH CAROLINA.

ANTIFRICTION-BEARING.

1,198,370.  Specification of Letters Patent.  Patented Sept. 12, 1916.

Application filed June 7, 1915. Serial No. 32,679.

*To all whom it may concern:*

Be it known that I, WILLIAM W. NEIGHBOUR, a citizen of the United States, residing at Spartanburg, in the county of Spartanburg and State of South Carolina, have invented new and useful Improvements in Antifriction-Bearings, of which the following is a specification.

The invention relates to an improvement in bearings of the anti-friction type and particularly to a divided radial bearing particularly useful in connection with shafting and machinery parts, wherein such shaft or parts cannot be readily stripped of its pulleys and connections to permit the application of the ordinary bearing.

The main object of the present invention is the provision of a radial bearing with a divided bushing and separator, wherein the anti-friction bodies are held in such manner that the separation of the parts will not produce an obstruction to the smooth operation by reason of such parts coming in contact with each other.

The invention in its preferred form of details will be described in the following specification, reference being had particularly to the accompanying drawings, in which:

Figure 1 is a vertical sectional view through the improved bearing. Fig. 2 is a transverse sectional view through the same. Fig. 3 is an elevation of the end plates for use with the bearing. Fig. 4 is a broken perspective of the separator and retainer. Fig. 5 is an elevation of the bushing in operative relation. Fig. 6 is a similar view omitting the raceway. Fig. 7 is a view in elevation illustrating the application of the sections of the bushings. Fig. 8 is a sectional view of a bearing showing the modified form of retainer. Fig. 9 is a transverse section of the same. Fig. 10 is a broken plan of one of the sections of the retainer.

In the accompanying drawing, the improved bearing is made up of two sections 1 and 2, constructed exteriorly and interiorly in accordance with the particular use for which the bearing is designed, being generally, however, of partly annular formation and together constituting a complete bearing box. The section 1 is of greater annular dimensions than the section 2, that is, constitutes more than one-half of the box proper, the upper edges 3 of the shaft receiving space being cut away beyond the truly circumferential to permit the application of the shaft, or the bearing to the shaft without interference. The section 1 is, at its meeting edge with section 2, cut away or shouldered as at 4 to receive the meeting end 5 of the section 2 whereby the two sections are locked against lateral separation while at the same time being readily separable when desired for removal or replacement. The respective sections are provided at diametrically opposite points of the bearing, as a whole, with oval sockets 6 and 7, to receive the supporting bolts of the hanger frame, the diametrically opposed surfaces 8 of the section 1 being arranged to receive the alining bolts of the hanger.

Arranged upon the shaft 9 with which the bearing coöperates are two spirally formed bushings 10 having their respective ends 11 overlying the shaft on the same side thereof and the opposite ends of the respective bushings meeting, as more particularly shown in Fig. 5, so as to provide a smooth continuous raceway 12 within which the anti-friction elements, as balls 13, are free to rotate and move without jar or noise. This particular construction of the bushings is important in that it permits the ready application to the shaft of such bushings without placing the same upon the shaft from one free end thereof and by reason of the free spring ends thereof insures a gripping action upon the shaft so that the bushings may be set to be self-securing to the natural resiliency to the metal of which they are composed.

In connection with the bushings, I provide separators 14 of metal or fiber cut or bored from the ends leaving a space as 15 in the center or at the end and thus having two rows of bodies in staggered formation. The metal is cut on a miter bent upward over the ball or roller, if the latter is used, presenting a smooth bearing surface to carry it around instead of the usual sharp edges provided.

End plates 15 are secured to the bearing sections 1 and 2. At each end thereof, each side plate being in two sections corresponding approximately to the size of the sections 1 and 2. The larger section of the end plate presents an edge 16 approximately in line with the division line between the sections 1 and 2, the inner opening of the end plate being cut away at 17 to permit its application to the bearing around the shaft. The smaller section of the end plate has a shoulder 18 bearing against the shoulder 17 and a projection 19 fitting into the cut away portion 17 of the larger section of the end plate. By this means the opening of the end plate as an entirety is approximately coincident with that of the shaft rendering the bearing dust proof in so far as it is possible.

From the above construction it will be obvious that the bearing as a whole is constructed for ready and convenient application to a shaft without the necessity of applying the bearing from the end and, therefore, the stripping of the shaft of parts already mounted thereon. The bushings are readily and conveniently sprung into position, and when applied frictionally grip the shaft to provide a smooth even raceway in which the balls or rollers freely operate without interference. The various parts of the bearing are designed to be constructed of suitable material and it is to be understood that I contemplate various modifications within the purview or mechanical expediency to adapt the bearing to any special shafting or hanger. It will of course be apparent that from the construction described either of the sections 1 and 2 of the bearing is in conjunction with the separator, the latter being in this instance undivided, thus providing for different characters of journals.

With particular reference to Figs. 8, 9 and 10, wherein the bushing is of the type shown in Fig. 6, and the retainer and spacer are adapted to carry rollers as the antifriction element, it will be noted that aside from the roller retainer or cage the construction is similar to that previously described. The roller and cage is made in two distinct semi-circular sections 20, 21, so that the cage as a whole may be applied to a shaft at any desired point thereon without necessitating endwise engagement. The cage proper which is illustrated more particularly in Fig. 10 is of the form illustrated comprising an integral section having transverse parallel portions 22 connected at opposite ends by strips 23. This provides in effect parallel spaces or channels alternately open at opposite ends, and the walls 22 of the channels are rounded as at 24 to conform to the curvature of the roller bearings 25. With the cage applied so that the sections present together a complete annular member with the channels extending longitudinally of the shaft or more strictly speaking, bushing, the rollers are simply inserted between the longitudinal sections 22 of the cage, being inserted alternately from opposite ends with the roller coextensive in length with the length of the side strip 22 beyond the end strip 23. The rollers are thus in effect slightly staggered but together present a rolling surface throughout the full width or length of the bearing.

I claim:—

1. A two-part bearing having one part of greater surface area than the other to envelop more than one-half of the shaft, said greater part being non-circular and of increased interior dimension adjacent its juncture with the lesser part of the bearing, whereby to provide in said greater part an entrance opening for the movable bearing elements and shaft.

2. A two-part bearing having one part of greater surface area than the other to envelop more than one-half of the shaft, said greater part being non-circular and of increased interior dimension adjacent its juncture with the lesser part of the bearing, whereby to provide in said greater part an entrance opening for the movable bearing elements and shaft, the meeting ends of the two parts of the bearing being formed for interlocking against lateral displacement.

3. A separator for bearings including a member of plate like formation formed with transversely extending openings having edge walls, the walls being extended beyond the member and being respectively of maximum height at opposite ends, whereby the minimum height of one wall is opposite the maximum height of the other.

4. A separator for bearings including a member of plate like formation formed with transversely extending openings having edge walls, the walls being extended beyond the member and being respectively of maximum height at opposite ends, whereby the minimum height of one wall is opposite the maximum height of the other, the walls being curved to conform to the bearing member.

In testimony whereof I affix my signature in presence of two witnesses.

WILLIAM W. NEIGHBOUR.

Witnesses:
B. C. CHAPMAN,
J. T. WILLARD.